(12) United States Patent
Ueda et al.

(10) Patent No.: US 6,473,841 B1
(45) Date of Patent: Oct. 29, 2002

(54) SIGNAL PROCESSING APPARATUS WITH MEMORY ACCESS HISTORY STORAGE

(75) Inventors: Yasushi Ueda; Takahiro Watanabe, both of Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/509,520

(22) PCT Filed: Oct. 19, 1999

(86) PCT No.: PCT/JP99/05744

§ 371 (c)(1),
(2), (4) Date: Jun. 23, 2000

(87) PCT Pub. No.: WO00/23895

PCT Pub. Date: Apr. 27, 2000

(30) Foreign Application Priority Data

Oct. 20, 1998 (JP) .......................................... 10-316941

(51) Int. Cl.[7] .............................................. G06F 12/00
(52) U.S. Cl. ........................................ 711/156; 711/151
(58) Field of Search ................................ 711/147, 150, 711/151, 156

(56) References Cited

U.S. PATENT DOCUMENTS 6,314,530 B1 * 11/2001 Mann ........................... 714/25

FOREIGN PATENT DOCUMENTS

| EP | 0 316 609 | 5/1989 |
| EP | 0 710 029 | 5/1996 |
| JP | 61-262945 | 11/1986 |
| JP | 63-229559 | 9/1988 |
| JP | 4-127348 | 4/1992 |
| JP | 6-187256 | 7/1994 |

* cited by examiner

Primary Examiner—Hiep T. Nguyen
(74) Attorney, Agent, or Firm—McDermott, Will & Emery

(57) ABSTRACT

In a signal processing apparatus having a memory and plural blocks for accessing the memory provided in an LSI, for the ease of cause analysis in the event of a fault, a trace control block 170 is provided, and by setting from a microcomputer 110, start and end of storing of access history from the required memory access block and content of storing are controlled, and a specified region of the memory is traced. In the event of a fault, by reading out the specific tracing region in the built-in memory 160 from outside, the cause can be analyzed easily.

7 Claims, 2 Drawing Sheets

SIGNAL PROCESSING APPARATUS WITH MEMORY ACCESS HISTORY STORAGE

TECHNICAL FIELD

The present invention relates to a signal processing system having a memory built in an LSI.

BACKGROUND OF THE INVENTION

In a conventional signal processing apparatus, in order to utilize the bus information such as data and address appearing in the bus in system operation, as fault analysis data in the event of fault taking place in the system, it is stored in an analyzing device such as logic analyzer, or a tracing mechanism as disclosed in the Japanese Laid-open Patent No. 6-187256 is added to the system.

However, owing to the recent advancement in the semiconductor technology, the LSI integrating various function blocks and memories on one chip by large scale is being developed, but in the conventional constitution of signal processing apparatus as mentioned above, since memory interface signal is not issued outside of the LSI, the analyzer cannot be connected, and in the event of fault, necessary information for fault analysis cannot be obtained. Or, to form the tracing mechanism inside the LSI, it requires an exclusive control circuit for fault analysis and an exclusive trace memory, which gives rise to increase in the area of LSI and the cost.

DISCLOSURE OF THE INVENTION

To solve the above problems, the signal processing apparatus of the invention is a signal processing apparatus having a memory and plural blocks for accessing the memory provided inside the LSI, which comprises an arbitration block for receiving each memory use request signal issued from the memory access blocks, arbitrating the memory use right, and accessing the memory, and a trace control block for issuing a memory request signal for storing the memory access history in the memory on the basis of the result of arbitration, and controlling start and end of storing of this access history in the memory and the content of storing, and therefore without requiring any particular control circuit exclusively for fault analysis or exclusive trace memory, necessary information for fault analysis may be obtained easily in the event of fault.

A first aspect of the invention relates to a signal processing apparatus having a memory and plural blocks for accessing the memory provided inside the LSI, being a signal processing apparatus comprising an arbitration block for receiving each memory use request signal issued from the memory access blocks, arbitrating the memory use right, and accessing the memory, and a trace control block for. issuing a memory request signal for storing the memory access history in the memory on the basis of the result of arbitration, and controlling start and end of storing of this access history in the memory and the content of storing, in which the trace control block acts to control start and end of storing of access history necessary when tracing the access history in the memory and the content of storing.

A second aspect of the invention relates to a signal processing apparatus of the first aspect, in which a rewritable register is provided in the trace control block, and the memory access block for storing the access history is selected by setting of the register from outside of the LSI, and therefore by setting the rewritable register as desired from outside of the LSI, the memory access block for storing the access history can be freely selected from outside.

A third aspect of the invention relates to a signal processing apparatus of the first aspect, in which a rewritable register is provided in the trace control block, and a trigger signal is issued outside of the LSI after a specified period determined from outside of the LSI when the value set in the register from outside of the LSI and the access history to be stored are matched, and therefore the trigger signal issued to the outside of the LSI starts operation or terminates operation of an external measuring instrument, and a signal outside of the LSI synchronized with trace process can be also recognized easily.

A fourth aspect of the invention relates to a signal processing apparatus of the first aspect, in which a rewritable register is provided in the trace control block, and the storing function is started after a specified period determined from outside of the LSI when the value set in the register from outside of the LSI and the access history to be stored are matched, and therefore by starting the storing function after the specified period set from outside of the LSI, starting from the trace process to the memory of a specific access history, the subsequent trace process can be left over, and when analyzing a cause of trouble, for example, if the problem triggering access is known, by setting such access, the cause may be easily analyzed.

A fifth aspect of the invention relates to a signal processing apparatus of the first aspect, in which a rewritable register is provided in the trace control block, and the storing function is terminated after a specified period determined from outside of the LSI when the value set in the register from outside of the LSI and the access history to be stored are matched, and therefore by terminating the storing function after the specified period set from outside of the LSI, tracing back from the trace process to the memory of a specific access history, the preceding trace process can be left over, and when analyzing a cause of trouble, for example, if the access after onset of problem is known, by setting such access, the cause may be easily analyzed.

A sixth aspect of the invention relates to a signal processing apparatus of the first aspect, in which a rewritable register is provided in the trace control block, and the access history is stored from a specified position in the memory, and therefore by storing the access history from the specified position in the memory, if trace process of access history in the memory is not necessary, the region of the memory for trace process may be minimized, and it can be used for ordinary function other than trace process, and the storing start position can be changed depending on the required trace storing amount in the event of a trouble.

A seventh aspect of the invention relates to a signal processing apparatus of the first aspect, in which a rewritable register is provided in the trace control block, and the access history is stored to a specified position in the memory, and therefore by storing the access history to the specified position in the memory, if trace process of access history in the memory is not necessary, the region of the memory for trace process may be minimized, and it can be used for ordinary function other than trace process, and the storing end position can be changed depending on the required trace storing amount in the event of a trouble.

DESCRIPTION OF THE PREFERRED EMBODIMENTS

Figure 1:
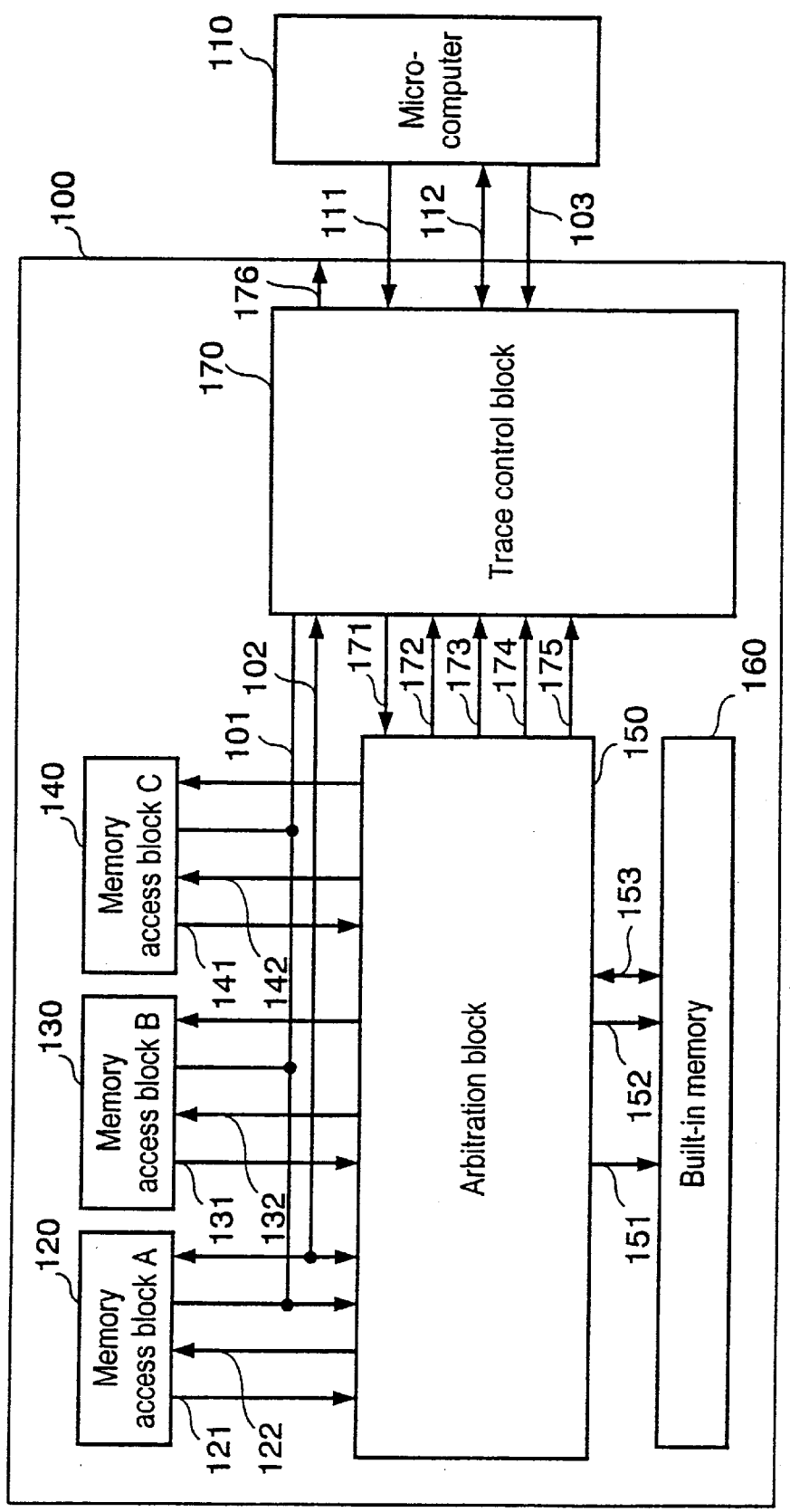
FIG. 1 is an electric block diagram in an embodiment of a signal processing apparatus of the invention.

An embodiment of a signal processing apparatus of the invention is described below while referring to the drawings.

In FIG. 1, a signal processing apparatus 100 is controlled from outside by a microcomputer 110. The signal processing apparatus 100 comprises a memory access block A 120, a memory access block B 130, and a memory access block C 140 for reading or writing a built-in memory 160. The signal processing apparatus 100 is composed of an arbitration block 150 for arbitrating the right of use of the memory on the basis of each memory access request from the memory access block A 120, memory access block B 130, and memory access block C 140, and accessing the built-in memory 160, and a trace control block 170 for controlling to store the memory access history in the built-in memory 160 on the basis of the result of arbitration by the arbitration block 150.

Figure 2:
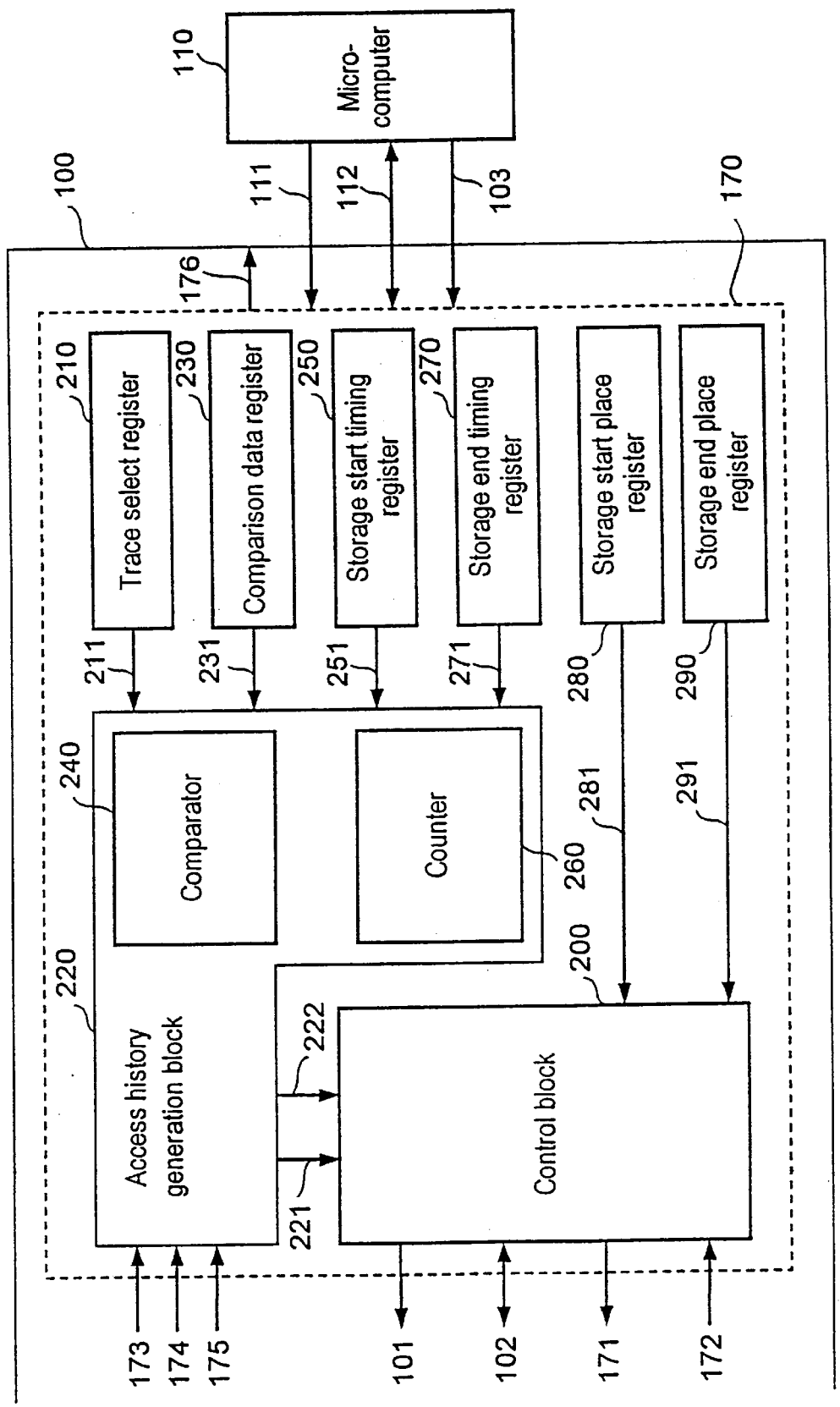
FIG. 2 is a partial detailed electric block diagram of FIG. 1.

In FIG. 2, the trace control block 170 incorporates a control block 200 for generating a control signal for storing the memory access history, a trace select register 210 for setting initially by the microcomputer 110 by using microcomputer address bus 111, microcomputer data bus 112 and microcomputer control, signal 103, a comparison data register 230, a storage start timing register 250, a storage end timing register 270, a storage. start place register 280, and a storage end place register 290, and further a comparator 240 and a counter 260 are provided in an access history generating block 220 for generating access history data.

To explain the operation of the embodiment more specifically, in the region from address AAA to BBB in the built-in memory 160, after the memory access block B 130 starts its operation, the memory access block A 120 writes data DDD in address CCC, and up to count EEE, the access history of the memory access block C 140 is stored, then an external trigger signal is generated when the memory access block C 140 writes data GGG in address FFF.

Herein, the access history includes the access block name, type of access, memory address and memory data.

The operation in this embodiment is described below. Before start of access of the built-in memory 160, first, the rewritable registers are set initially by the microcomputer 110.

In the trace select register 210, the memory access block C 140 is set as the access block name, read or write as the type of access, and memory address and memory data as the history data; in the comparison data register 230, the memory access block C 140 is set as the comparison block name, write as the type of access, FFF as the comparison address, and GGG as comparison data; in the storage start timing register 250, the memory access block B 130 is set as the storage start timing block name, read or write as the type of access, all as the storage start timing address, all as the storage start timing data, and 0 count as the storage start timing; in the storage end timing register 270, the memory access block A 120 is set as the storage end timing block name, write as the type of access, CCC as the storage end timing address, DDD as the storage end timing data, and EEE as the storage end timing; in the storage start place register 280, AAA is set as the storage start address; and in the storage end place register 290, BBB is set as the storage end address..

After this initial setting, the system starts its operation, and the memory access block A 120 sends a memory use request signal 121, the memory access block B 130 sends a memory use request signal 131, and the memory access block C 140 sends a memory use request signal 141, to the arbitration block 150. The arbitration block 150 sends back the memory use acknowledgement signal meaning the memory use request signal is accepted to the memory access block of the highest order by judging the acceptance priority order of the request signals. Herein, supposing the acceptance priority order to be memory access block A 120>memory access block B 130>memory access block C 140, the arbitration block 150 sends back the memory use acknowledgement signal 122 to the memory access block A 120, and the built-in memory 160 in the memory access block A 120 is accessed by using the memory control signal 151, memory address bus 152, and memory data bus 153. At this time, the arbitration block 150 issues an arbitration result signal 173, an arbitration result address bus 174 and an arbitration result data bus 175 to the trace control block 170, and such information issued from the arbitration block 150 is compared with the data in a storage start timing data bus 251 in the comparator 240 in the access history generation block 220 of the trace control block 170, and herein since the storage start timing block name in the storage start timing data bus 251 is the memory access block B 130, and no coincidence is detected, and hence trace process is not executed.

After the memory access block A 120 acknowledged of memory use request has withdrawn the memory use request signal 121, the arbitration block 150 accepts the memory use request signal 131 of the memory access block B 130 of the next highest acceptance priority order, and sends back a memory use acknowledgement signal 132 to the memory access block B 130, thereby accessing the built-in memory 160 of the memory access block B 130. At this time, similarly, the arbitration block 150 issues an arbitration result signal 173, an arbitration result address bus 174 and an arbitration result data bus 175 to the trace control.block 170, and such information issued from the arbitration block 150 is compared with the data in the storage start timing data bus 251 in the comparator 240 in the access history generation block 220 of the trace control block 170. In this case, the storage start timing data bus 251 coincides because read or write is set in the memory access block B 130 (in this case, since the address and data are not set, the arbitration result address bus 174 and the arbitration result data bus 175 are not compared). Once coincidence is detected, the counter 260 in the access history generation block 220 is started. Although coincidence is detected, since the object of tracing set in the trace select register 210 is the memory access block C 140, trace process is not executed in this case, either.

After the memory access block B 130 acknowledged of memory use request has withdrawn the memory use request signal 131, the arbitration block 150 accepts the memory use request signal 141 of the memory access block C 140 of the next highest acceptance priority order, and sends back a memory use acknowledgement signal 142 to the memory access block C 140, thereby accessing the built-in memory 160 of the memory access block C 140. At this time, similarly, the arbitration block 150 issues an arbitration result signal 173, an arbitration result address bus 174 and an arbitration result data bus 175 to the trace control block 170. Already, in the comparator 240 in. the access history generation block 220 of the trace control block 170, coincidence with the storage start timing data bus 251 has been detected, and hereinafter coincidence between the trace select data bus 211 and arbitration. result signal 173 is detected. When counting the coincidence by a preset value (in this embodiment, since the set value is 0, tracing is started immediately), every time coincidence is detected thereafter, in the access history generation block 220, a trace control signal 221 and a history data bus 222 are generated by the arbitration result signal 173, arbitration result address bus 174 and arbitration result data bus 175, and sent out to the control block 200. The control block 200 sends out, on the basis of the received trace control signal 221 and history data bus 222, a memory use request signal for trace 171 for tracing the access history, a data bus for arbitration 102, and an address bus for arbitration 101.

At the same time, the address AAA calculated from the storage start place data bus 281 is sent out to the address bus for arbitration 101. This address is incremented up to the address BBB of the storage end place data bus 291, and is initialized again to the address AAA of the storage start place data bus 281. In the arbitration block 150, the memory use request signal for trace 171 is arbitrated same as other request signal, and when the memory use right is acknowledged, the arbitration block 150 sends back a memory use acknowledgement signal for trace 172 to the control block 200. The control block 200 receives the memory use acknowledgement signal for trace 172 and recognizes that the access history has been traced, and withdraws the memory use request signal for trace 171.

Repeating this operation, thereafter, every time the memory access block C 140 is accessed, the history data is traced to the built-in memory 160, and at the same time the comparator 240 checks for coincidence of the arbitration result signal 173, arbitration result address bus 174 and arbitration result data bus 175 with the data of the storage end timing data bus 271. When the memory access block A 120 writes data DDD in the address CCC, coincidence is detected, and the counter 260 is started again. After starting, when the coincidence of the trace select data bus 211 and arbitration result signal 173 is counted by EEE, the subsequent tracing of history data is terminated.

The comparator 240 checks if the arbitration result signal 173, arbitration result address bus 174 and arbitration result data bus 175 are coinciding with the data of the comparison data bus 231, and issues a trigger signal 176 every time coincidence is detected.

The explanation herein relates to an example of tracing of access history data of one memory access block, but it is also applicable to simultaneous tracing of a plurality of memory access blocks.

Industrial Applicability

According to the signal processing apparatus of the invention having a memory provided in an LSI, without requiring any trace memory exclusive for access history data in the system, the information necessary for analysis of operation in the event of fault is obtained in the same condition as when trace process is not executed, without increasing the load of the memory bus, only by addition of a small control circuit such as trace control block, and therefore, among various beneficial effects, occurrence of fault can be regenerated easily, and the cause can be analyzed smoothly.

What is claimed is:

1. A signal processing apparatus having a memory and plural blocks for accessing the memory provided inside an LSI comprising an arbitration block for receiving each memory use request signal issued from said memory access blocks, arbitrating the memory use right, and accessing the memory, and a trace control block for issuing a memory request signal for storing a memory access history of a predetermined block of said plural blocks in said memory on the basis of said result of arbitration, and controlling start and end of storing of the memory access history in the memory and the content of storing.

2. A signal processing apparatus of claim 1, wherein a rewritable register is provided in the trace control block, and the memory access block for storing the access history is selected by setting of said register from outside of the LSI.

3. A signal processing apparatus of claim 1, wherein a rewritable register is provided in the trace control block, and a trigger signal is issued outside of the LSI after a specified period determined from outside of the LSI when the value set in said register from outside of the LSI and the access history to be stored are matched.

4. A signal processing apparatus of claim 1, wherein a rewritable register is provided in the trace control block, and the storing function is started after a specified period determined from outside of the LSI when the value set in said register from outside of the LSI and the access history to be stored are matched.

5. A signal processing apparatus of claim 1, wherein a rewritable register is provided in the trace control block, and the storing function is terminated after a specified period determined from outside of the LSI when the value set in said register from outside of the LSI and the access history to be stored are matched.

6. A signal processing apparatus of claim 1, wherein a rewritable register is provided in the trace control block, and the access history is stored from a specified position in the memory.

7. A signal processing apparatus of claim 1, wherein a rewritable register is provided in the trace control block, and the access history is stored to a specified position in the memory.

* * * * *